United States Patent
Huang et al.

(10) Patent No.: US 8,970,527 B2
(45) Date of Patent: Mar. 3, 2015

(54) CAPACITIVE TOUCH PANEL HAVING MUTUAL CAPACITANCE AND SELF CAPACITANCE SENSING MODES AND SENSING METHOD THEREOF

(75) Inventors: Yen Lin Huang, Taipei (TW); Chien Ying Huang, Hsinchu (TW)

(73) Assignee: Orise Technology Co., Ltd., Hsinchu Science Park (TW)

( * ) Notice: Subject to any disclaimer, the term of this patent is extended or adjusted under 35 U.S.C. 154(b) by 183 days.

(21) Appl. No.: 13/611,237

(22) Filed: Sep. 12, 2012

(65) Prior Publication Data

US 2013/0155007 A1    Jun. 20, 2013

(30) Foreign Application Priority Data

Dec. 20, 2011  (TW) .............................. 100147420 A

(51) Int. Cl.
*G06F 3/041*    (2006.01)

(52) U.S. Cl.
USPC ........................................................ 345/173

(58) Field of Classification Search
CPC ................................ G06F 3/0416; G06F 3/044
USPC ........................................................ 345/173
See application file for complete search history.

(56) References Cited

U.S. PATENT DOCUMENTS

| | | | |
|---|---|---|---|
| 2011/0234523 A1* | 9/2011 | Chang et al. | 345/173 |
| 2011/0298744 A1* | 12/2011 | Souchkov | 345/174 |
| 2012/0044199 A1* | 2/2012 | Karpin et al. | 345/174 |
| 2012/0268142 A1* | 10/2012 | Kremin et al. | 324/658 |
| 2013/0016061 A1* | 1/2013 | Souchkov | 345/174 |

* cited by examiner

*Primary Examiner* — Long D Pham
(74) *Attorney, Agent, or Firm* — Bacon & Thomas, PLLC

(57) ABSTRACT

A low power driving and sensing system for capacitive touch panels includes a capacitive touch panel, a first switch device, a second switch device, a driving device, a sensing device, and a control device. The capacitive touch panel has plural first conductor lines arranged in a first direction and plural second conductor lines arranged in a second direction. The driving device is connected to the first switch device for driving the capacitive touch panel. The sensing device is connected to the second switch device for sensing the capacitive touch panel. The control device configures the first switch device and the second switch device for entering the capacitive touch panel into a self-capacitance mode such that the driving device and the sensing device perform a self capacitance sensing, and into a mutual capacitance mode such that the driving device and the sensing device perform a mutual capacitance sensing.

12 Claims, 12 Drawing Sheets

CAPACITIVE TOUCH PANEL HAVING MUTUAL CAPACITANCE AND SELF CAPACITANCE SENSING MODES AND SENSING METHOD THEREOF

CROSS REFERENCE TO RELATED APPLICATION

This application claims the benefits of the Taiwan Patent Application Serial Number 100147420, filed on Dec. 20, 2011, the subject matter of which is incorporated herein by reference.

BACKGROUND OF THE INVENTION

1. Field of the Invention

The present invention relates to the technical field of touch panels and, more particularly, to a low power driving and sensing method and system for capacitive touch panels.

2. Description of Related Art

Most of the current consumer electronics are provided with a touch pads for use as input devices. In order to meet with the light, thin, and small features, a touch pad is typically integrated with a panel as a touch panel for allowing convenient input. According to the sensing principle, the touch pad can be of resistive type, capacitive type, acoustic wave type, or optics type.

The operation principle of touch panels is to sense a voltage, a current, an acoustic wave or an infrared when a finger or other medium touches on a touch screen, so as to detect the coordinates of touching points. For example, a resistive touch panel uses the voltage difference between upper and lower electrodes to calculate the location where a force is applied, to thereby detect the touching point. A capacitive touch panel uses the current or the voltage originated from capacitance changes in a static electricity combination of transparent electrodes in row and column with human body to detect the touching coordinate.

For a capacitive touch panel, the driving is typically performed by sensing the grounded capacitance on each conductor line. Thus, a change of the grounded capacitance is used to determine whether an object is approached to the capacitive touch panel, which is known as a self capacitance sensing. Instead of being a physical capacitor, the self capacitance or the grounded capacitance is parasitic and stray capacitance on each conductor line. FIG. 1 is a schematic view of a typical self capacitance sensing. As shown in FIG. 1, during the first period of time, the driving and sensing devices 110 in a first direction drive the conductor lines in the first direction in order to charge the self capacitance of the conductor lines in the first direction. During the second period, the driving and sensing devices 110 sense the voltages on the conductor lines in the first direction. During the third period, the driving and sensing devices 120 in a second direction drive the conductor lines in the second direction in order to charge the self capacitance of the conductor lines in the second direction. During the fourth period, the driving and sensing devices 120 sense the voltages on the conductor lines in the second direction.

In the typical self capacitance sensing as shown by FIG. 1, both a driving circuit and a sensing circuit are connected to the same conductor line in order to drive the conductor line and sense a signal change on the same conductor line so as to determine a magnitude of the self capacitance. Such a self capacitance sensing has the advantages as follows:

(1) The amount of data is reduced since the typical touch panel has m+n data in a single frame only, so as to save the hardware cost;

(2) The time required for sensing a touch point is reduced since a frame row data can be quickly fetched due to only two sensing operations, i.e., concurrently or one-by-one sensing all the conductor lines in the first direction first and then in the second direction, for completing a frame, as well as a relatively reduced time required for converting a sensed signal from analog into digital; and (3) The power consumption is relatively low due to the reduced amount of data to be processed.

However, such a self capacitance sensing may encounter the disadvantages as follows:

(1) When there is a floating conductor, such as a water drop, an oil stain, and the like, on the touch panel, it is likely to cause an erroneous decision on a touch point; and (2) When there are multiple touch points concurrently on the touch panel, it may cause a ghost point effect, resulting in that such a self capacitance sensing cannot be used in a multi-touch application.

Another way of driving the typical capacitive touch panel is to sense a magnitude change of mutual capacitance Cm so as to determine whether the object is approached to the touch panel. Similarly, the mutual capacitance Cm is not a physical capacitor but a mutual capacitance between the conductor line in the first direction and the conductor line in the second direction. FIG. 2 is a schematic diagram of a typical mutual capacitance sensing. As shown in FIG. 2, the drivers 210 are arranged on the first direction (Y), and the sensors 220 are arranged on the second direction (X). At the upper half of the first period of time T1, the drivers 210 drive the conductor lines 230 in the first direction and use the voltage Vy_1 to charge the mutual capacitance (Cm) 250. At the lower half, all sensors 220 sense voltages (Vo_1, Vo_2, . . . , Vo_n) on the conductor lines 240 in the second direction so as to obtain n data. Accordingly, m*n data can be obtained after m driving periods.

Such a mutual capacitance sensing has the advantages as follows:

(1) It is easy to determine whether a touch is generated from a human body since a signal generated from a floating conductor is different from a grounded conductor; and (2) Each touch point is indicated by an actual coordinate, and thus the actual position of each point can be found when multiple points are concurrently touched, so that such a mutual capacitance sensing can easily support the multi-touch application.

However, there are some disadvantages as follows:

(1) The amount of a single frame row data is m*n, which is relatively higher than the amount under the self capacitance sensing;

(2) Scanning is done by a one-to-one manner in a selected direction. For example, when there are 20 conductor lines in the first direction (Y), the sensing operation has to be performed 20 times for obtaining a complete frame row data. Also, due to the large amount of data, the time required for converting a sensed signal from analog into digital is relatively increased; and (3) Due to the large amount of data, the power consumption is thus increased on data processing.

Therefore, it is desirable to provide an improved low power driving and sensing method and system for capacitive touch panels to mitigate and/or obviate the aforementioned problems.

SUMMARY OF THE INVENTION

The object of the present invention is to provide a low power driving and sensing method and system for capacitive touch panels, which can reduce the power consumption and which can be used in a handheld device for prolonging the lifetime of the handheld device.

According to one aspect of the invention, there is provided a low power driving and sensing system for capacitive touch panels is provided, which includes: a capacitive touch panel having a plurality of first conductor lines arranged in a first direction and a plurality of second conductor lines arranged in a second direction, wherein the first conductor lines and the second conductor lines include parasitic and stray capacitance respectively, and a mutual capacitance is formed at each overlap of the first and second conductor lines; a first switch device connected to the capacitive touch panel; a second switch device connected to the capacitive touch panel; a driving device connected to the first switch device for driving the capacitive touch panel through the first switch device; a sensing device connected to the second switch device for sensing a signal outputted by the capacitive touch panel through the second switch device; and a control device connected to the first switch device, the second switch device, the driving device, and the sensing device for configuring the first switch device and the second switch device to allow the capacitive touch panel to enter into a self capacitance mode, such that the driving device and the sensing device perform a self capacitance sensing, and to enter into a mutual capacitance mode, such that the driving device and the sensing device perform a mutual capacitance sensing, wherein, when the sensing device performs the self capacitance sensing, the control device determines that a number of touch points on the capacitive touch panel is smaller than a second predetermined number and accordingly maintains configuration of the first switch device and second switch device, such that the sensing device performs the self capacitance sensing, and otherwise the control device configures the first switch device and the second switch device, such that the sensing device performs the mutual capacitance sensing.

According to another aspect of the invention, there is provided a low power driving and sensing method for capacitive touch panels, which is implemented in a capacitive touch system including a capacitive touch panel, a first switch device, a second switch device, a driving device, a sensing device, and a control device, the capacitive touch panel having a sleep mode, a self capacitance mode, and a mutual capacitance mode. The method includes the steps of: (A) using the control device to determine whether a self capacitance of the capacitive touch panel is changed when the capacitive touch panel enters into the self capacitance mode from the sleep mode, and executing step (B) when the self capacitance of the capacitive touch panel is changed, otherwise returning to step (A); (B) using the control device to determine whether a number of touch points on the capacitive touch panel is greater than or equal to a second predetermined number, and executing step (C) when the number of touch points on the capacitive touch panel is greater than or equal to the second predetermined number; (C) using the control device to configure the first switch device and the second switch device for allowing the capacitive touch panel to enter into the mutual capacitance mode such that the sensing device performs a mutual capacitance sensing, using the control device to determine whether a mutual capacitance of the capacitive touch panel is changed, and executing step (D) when the mutual capacitance of the capacitive touch panel is changed, otherwise returning to step (A); and (D) using the control device to determine whether the number of touch points on the capacitive touch panel is greater than or equal to a first predetermined number, and executing step (C) when the number of touch points on the capacitive touch panel is greater than or equal to the first predetermined number, otherwise returning to step (A).

Other objects, advantages, and novel features of the invention will become more apparent from the following detailed description when taken in conjunction with the accompanying drawings.

DETAILED DESCRIPTION OF THE PREFERRED EMBODIMENT

Figure 1:
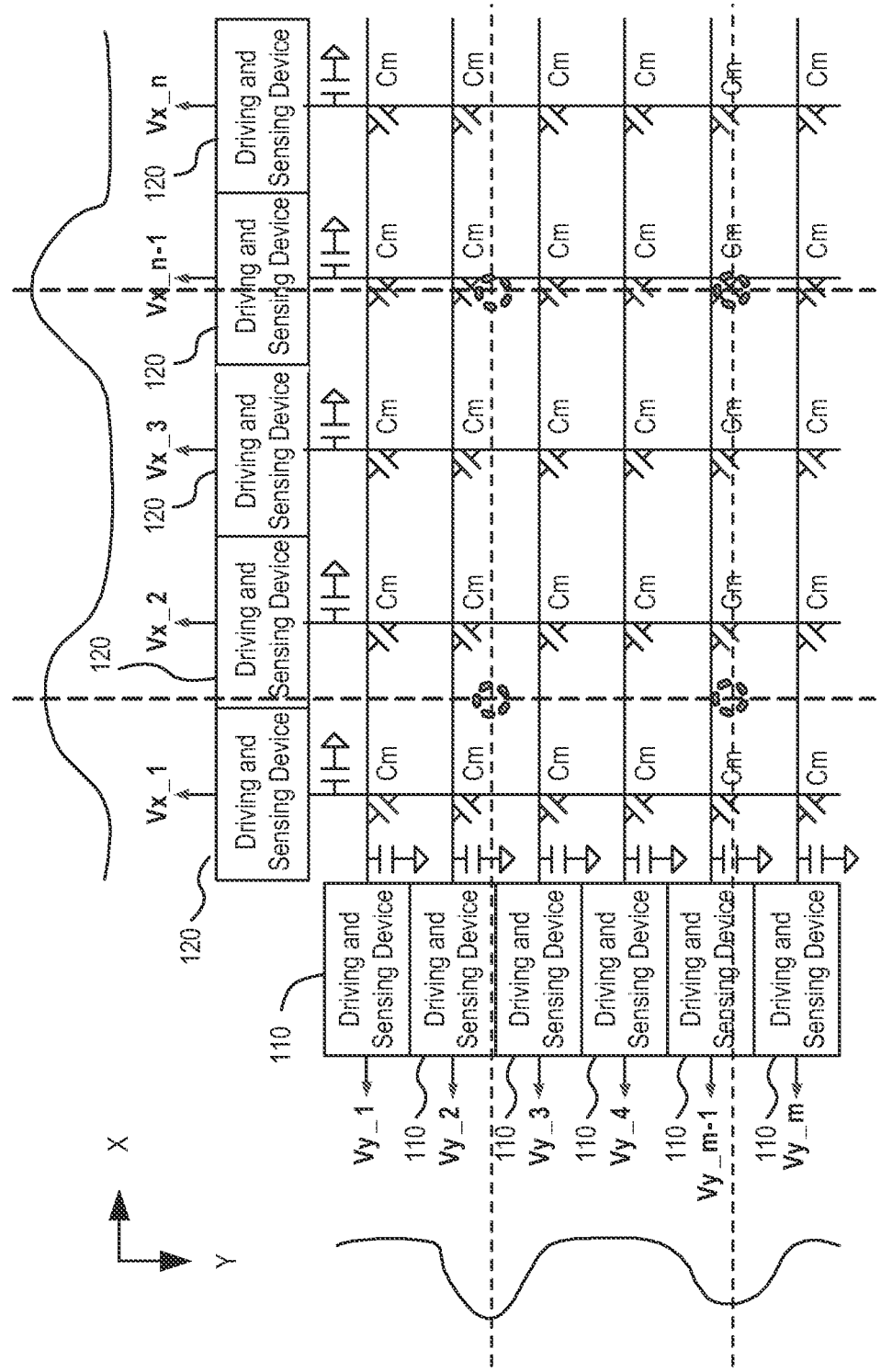
FIG. 1 is a schematic diagram of a typical self capacitance sensing.
Figure 2:
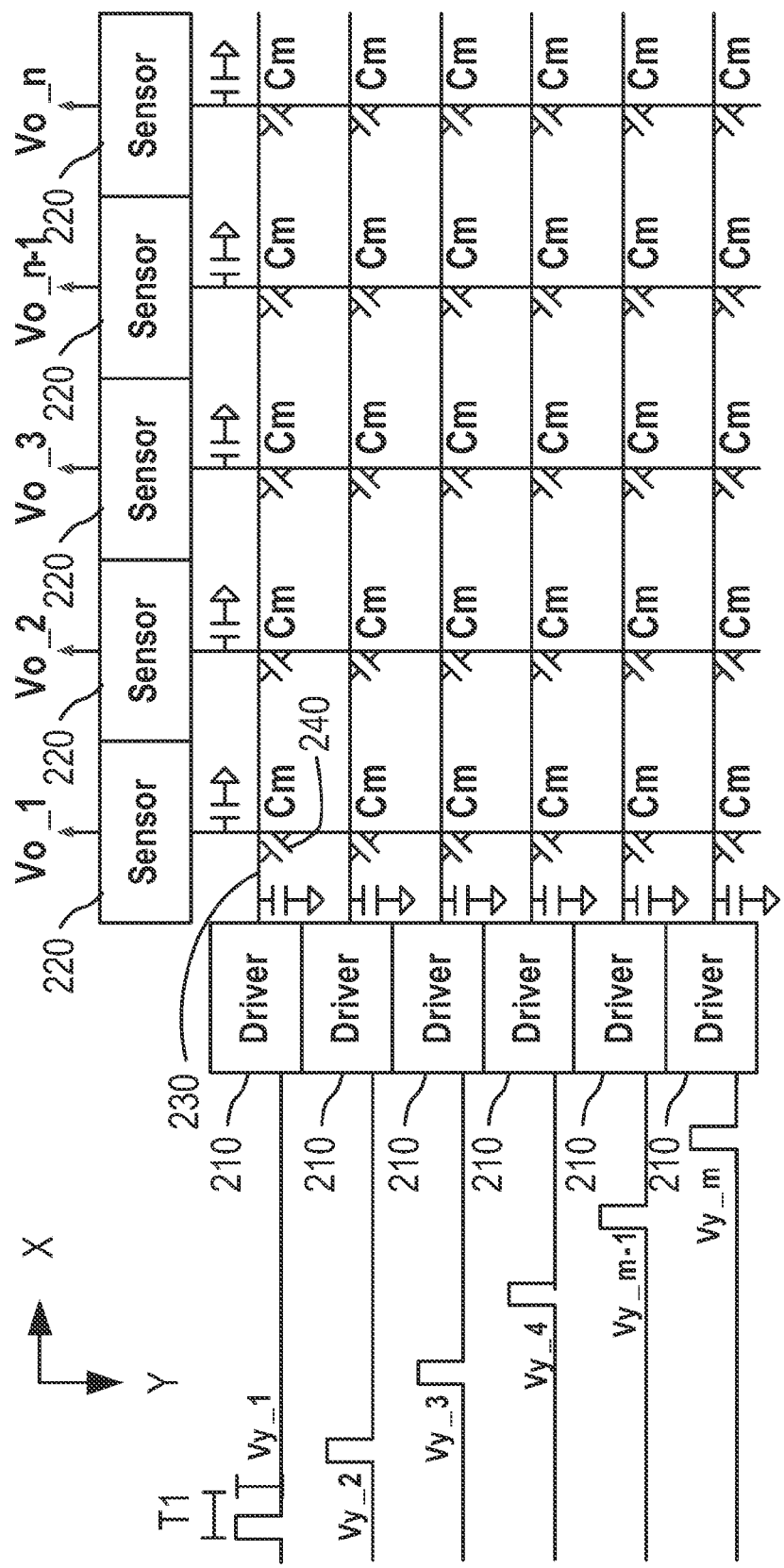
FIG. 2 is a schematic diagram of a typical mutual capacitance sensing.
Figure 3:
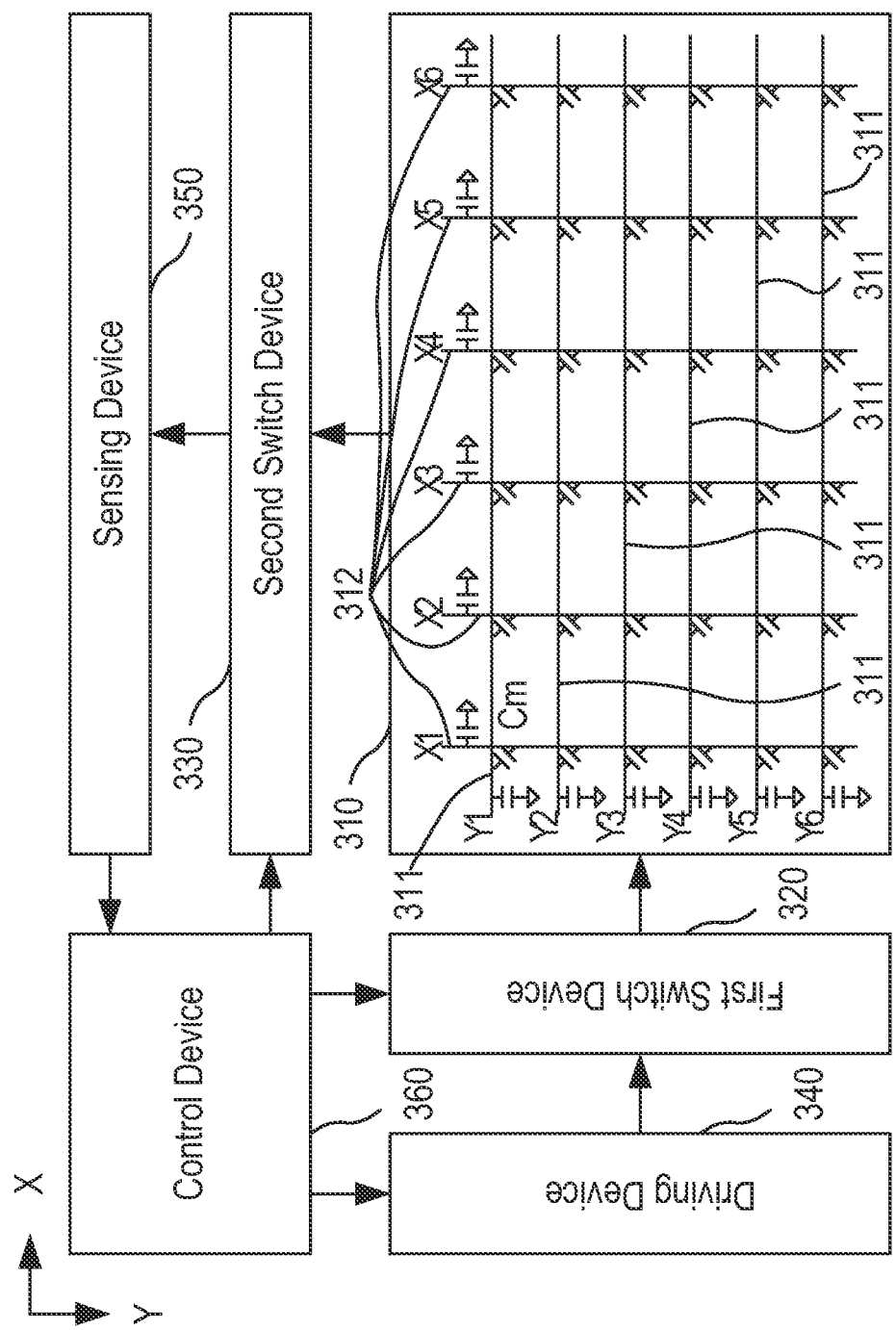
FIG. 3 is a block diagram of a low power driving and sensing system for capacitive touch panels according to an embodiment of the invention.

FIG. 3 is a block diagram of a low power driving and sensing system 300 for capacitive touch panels according to an embodiment of the invention. As shown in FIG. 3, the system 300 includes a capacitive touch panel 310, a first switch device 320, a second switch device 330, a driving device 340, a sensing device 350, and a control device 360.

The capacitive touch panel 310 has a plurality of first conductor lines 311 (Y1-Y6) arranged in a first direction (Y) and a plurality of second conductor lines 312 (X1-X6) arranged in a second direction (X), wherein the first direction (Y) is preferably vertical with the second direction (X). The first switch device 320 is connected to the capacitive touch panel 310. Further, the first switch device 320 is connected to the plurality of first conductor lines 311 (Y1-Y6) or the plurality of second conductor lines 312 (X1-X6).

The second switch device 330 is connected to the capacitive touch panel 310. Further, the second switch device 330 is connected to the plurality of first conductor lines 311 (Y1-Y6) or the plurality of second conductor lines 312 (X1-X6).

The driving device 340 is connected to the first switch device 320 for driving the capacitive touch panel 310 through the first switch device 320.

The sensing device 350 is connected to the second switch device 330 for sensing a signal outputted by the capacitive touch panel 310 through the second switch device 330.

The control device 360 is connected to the first switch device 320, the second switch device 330, the driving device 340, and the sensing device 350. The control device 360 may configure the first switch device 320 and the second switch device 330 into a self capacitance mode, such that the driving device 340 and the sensing device 350 perform a self capacitance sensing, and configure the first switch device 320 and the second switch device 330 into a mutual capacitance mode, such that the driving device 340 and the sensing device 350 perform a mutual capacitance sensing.

When the sensing device 350 performs the mutual capacitance sensing, and the control device 360 determines that the number of touch points on the capacitive touch panel 310 is smaller than a first predetermined number (B2), the control device 360 configures the first switch device 320 and the second switch device 330, such that the sensing device 350 can perform the self capacitance sensing. The first predetermined number (B2) is preferred to be one.

When the sensing device 350 performs the mutual capacitance sensing, and the control device 360 determines that the number of touch points on the capacitive touch panel 310 is greater than or equal to the first predetermined number, the control device 360 maintains the configuration of the first switch device 320 and second switch device 330, such that the sensing device 350 can perform the mutual capacitance sensing.

When the sensing device 350 performs the self capacitance sensing, and the control device 360 determines that the number of touch points on the capacitive touch panel 310 is smaller than a second predetermined number (A1), the control device 360 maintains the configuration of the first switch device 320 and second switch device 330, such that the sensing device 350 can perform the self capacitance sensing. The second predetermined number (A1) is preferred to be two.

When the sensing device 350 performs the self capacitance sensing, and the control device 360 determines that the number of touch points on the capacitive touch panel 310 is greater than or equal to the second predetermined number (A1), the control device 360 configures the first switch device 320 and second switch device 330, such that the sensing device 350 can perform the mutual capacitance sensing.

Figure 4:
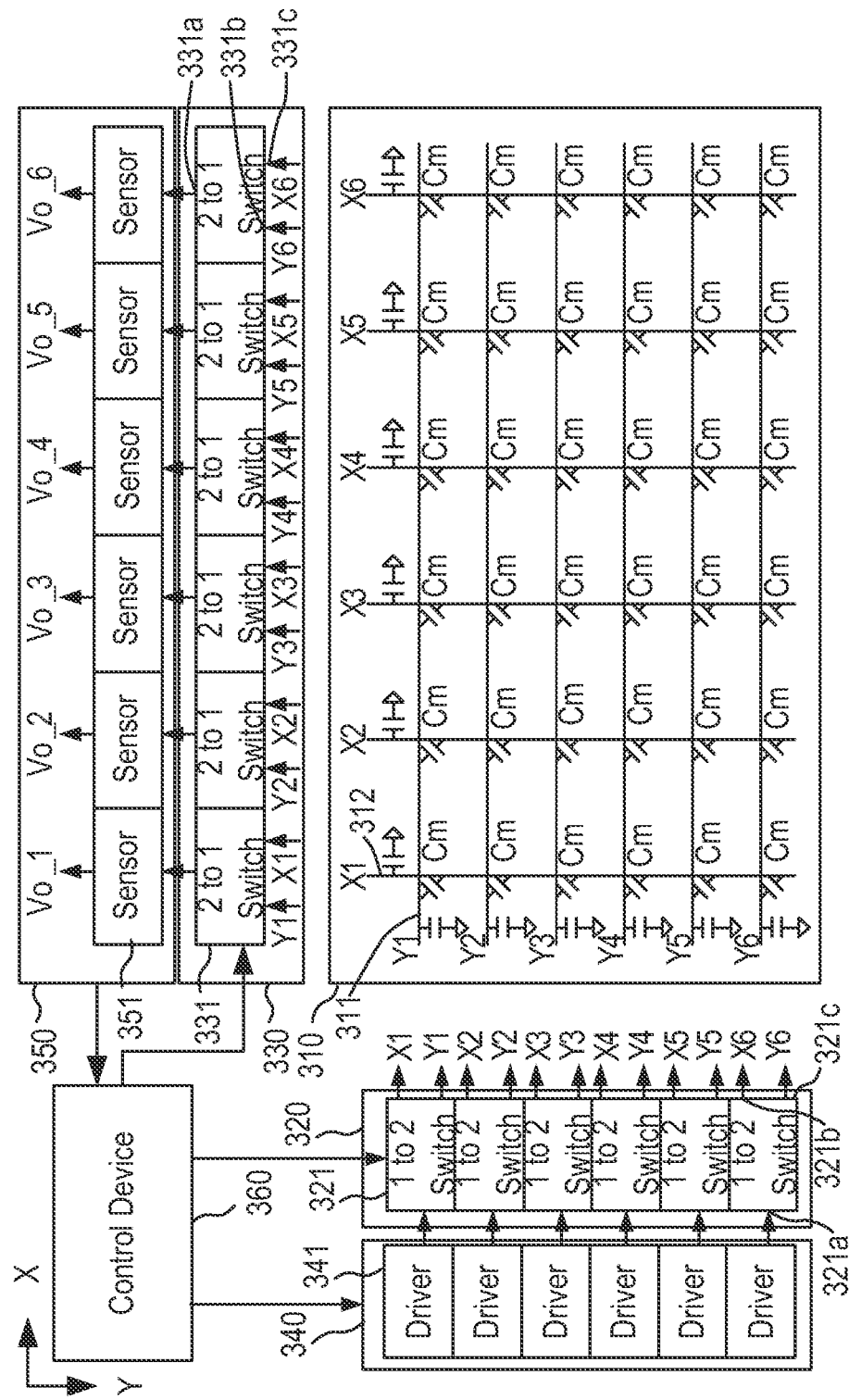
FIG. 4 is a circuit of a low power driving and sensing system for capacitive touch panels according to an embodiment of the invention.

FIG. 4 is a circuit diagram of a low power driving and sensing system for capacitive touch panels according to an embodiment of the invention. As shown in FIG. 4, the capacitive touch panel 310 has k first conductor lines 311 arranged in the first direction and k second conductor lines 312 arranged in the second direction, where k is a positive integer greater than two. The k first conductor lines 311 and the k second conductor lines 312 have parasitic and stray capacitance respectively, and the overlap of each first conductor line 311 and each second conductor line 312 forms the mutual capacitance Cm. For convenient description, k is 6 in this embodiment.

The first switch device 320 has six 1-to-2 switches 321, and the driving device 340 has six drivers 341. The i-th 1-to-2 switch 321 has a first terminal (321a) connected to the i-th driver 341, a second terminal (321b) connected to the i-th second conductor line 312 (Xi), and a third terminal (321c) connected to the i-th first conductor line 311 (Yi), where $1 \leq i \leq 6$. As known by those skilled in the art, the 1-to-2 switch 321 can be controlled to connect the first terminal (321a) to the second terminal (321b), or to connect the first terminal (321a) to the third terminal (321c). The second switch device 330 has six 2-to-1 switches 331, and the sensing device 350 has six sensors 351. The i-th 2-to-1 switch 331 has a first terminal (331a) connected to the i-th sensor 351, a second terminal (331b) connected to the i-th first conductor line (Yi), and a third terminal (331c) connected to the i-th second conductor line (Xi). As known by those skilled in the art, the 2-to-1 switch 331 can be controlled to connect the second terminal (331b) to the first terminal (331a), or to connect the third terminal (331c) to the first terminal (331a).

The self capacitance sensing can be divided into a first direction (Y) self capacitance sensing and a second direction (X) self capacitance sensing.

Figure 5:
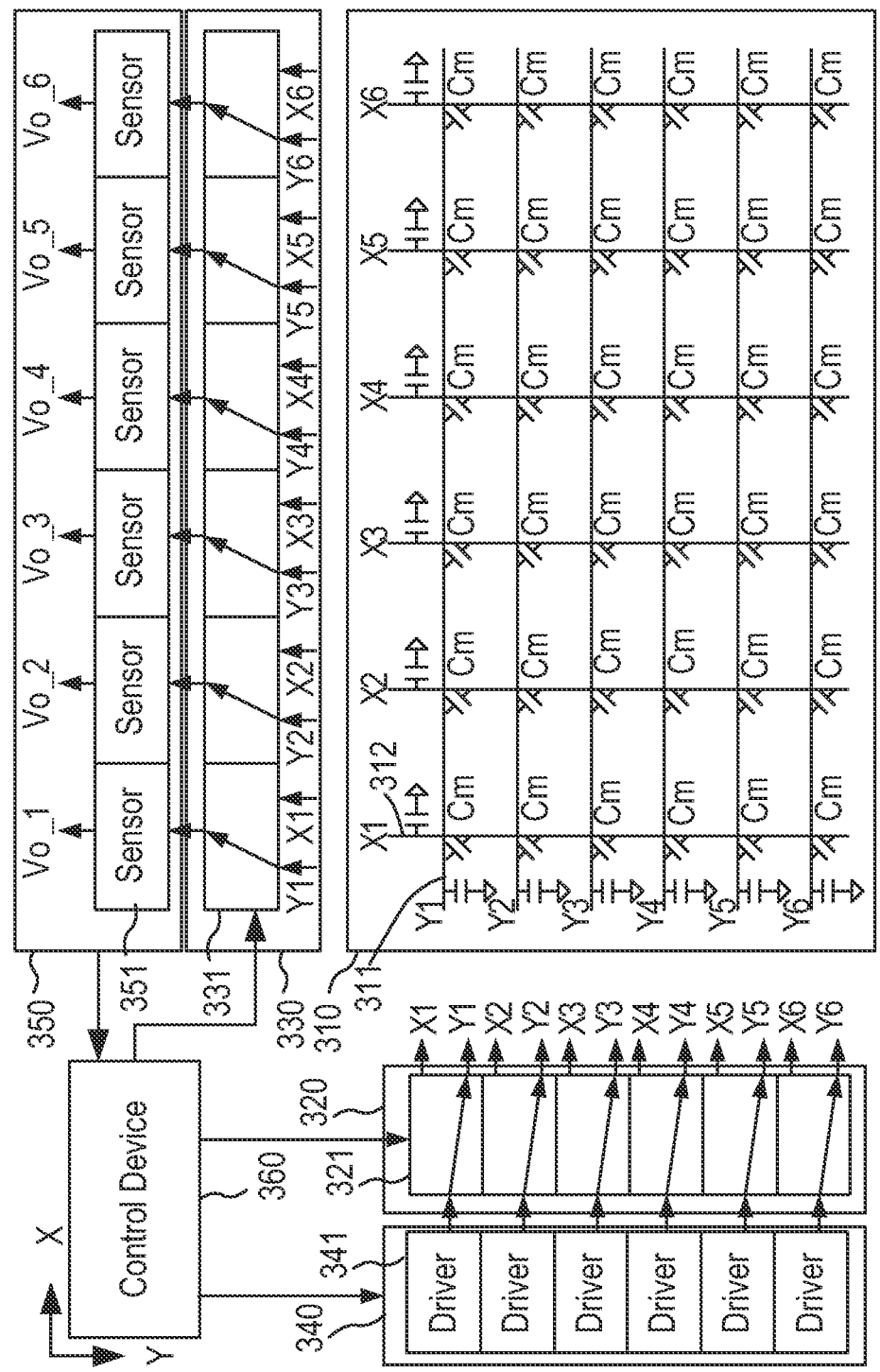
FIG. 5 is a schematic diagram of performing a first direction self capacitance sensing according to an embodiment of the invention.

FIG. 5 is a schematic diagram of performing a first direction (Y) self capacitance sensing according to an embodiment of the invention. As shown in FIG. 5, when the first direction (Y) self capacitance sensing is performed, the control device 360 configures the i-th 1-to-2 switch 321 and the i-th 2-to-1 switch 331, such that the i-th driver 341 is connected to the i-th first conductor line 311 (Yi) and the i-th sensor 351 is connected to the i-th first conductor line 311 (Yi), which are achieved by connecting the first terminal (321a) and third terminal (321c) of the i-th 1-to-2 switch 321 and by connecting the first terminal (331a) and second terminal (331b) of the i-th 2-to-1 switch 331.

Figure 6:
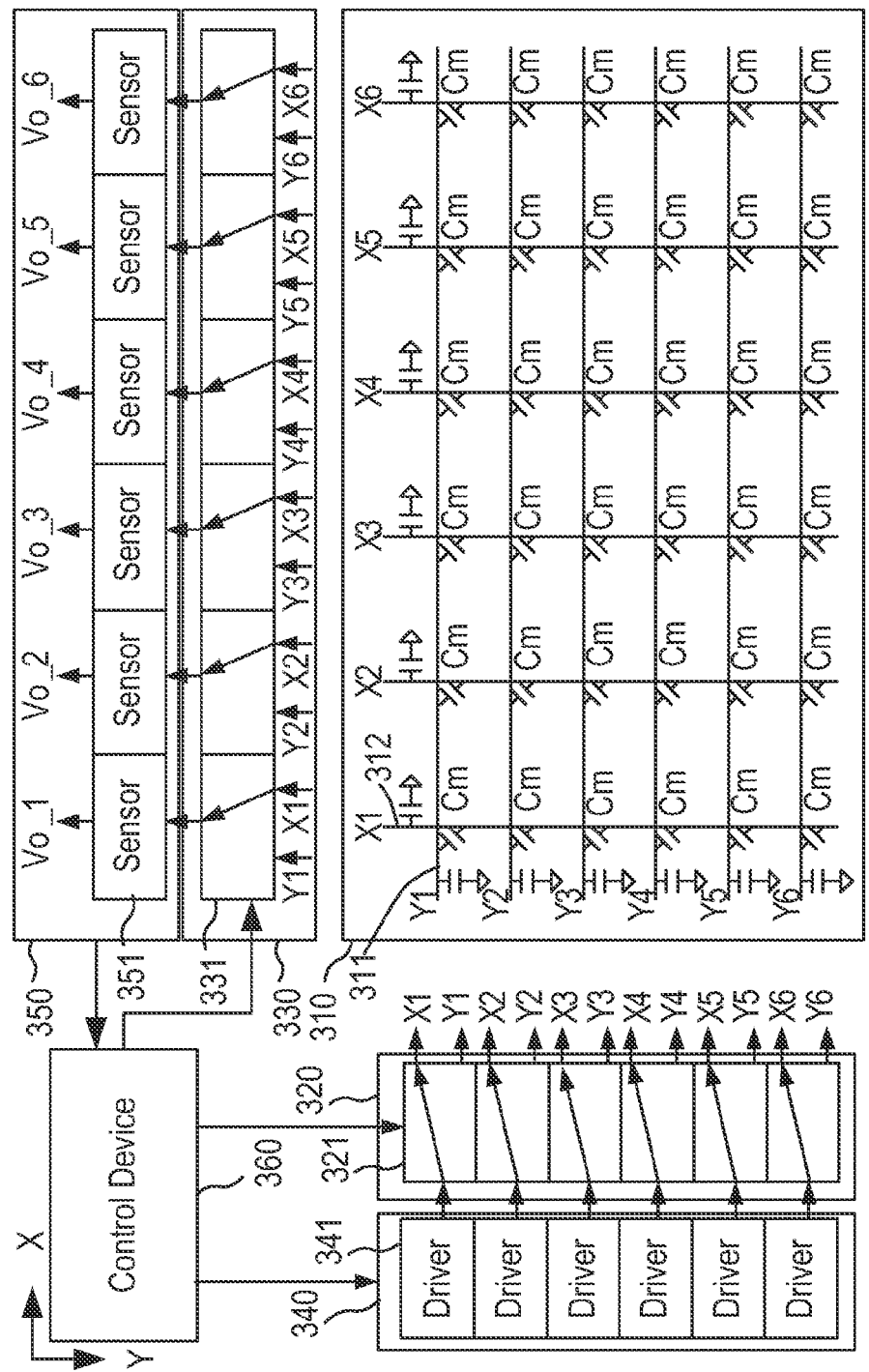
FIG. 6 is a schematic diagram of performing a second direction self capacitance sensing according to an embodiment of the invention.

FIG. 6 is a schematic diagram of performing a second direction (X) self capacitance sensing according to an embodiment of the invention. As shown in FIG. 6, when the second direction (X) self capacitance sensing is performed, the control device 360 configures the i-th 1-to-2 switch 321 and the i-th 2-to-1 switch 331, such that the i-th driver 341 is connected to the i-th second conductor line 312 (Xi) and the i-th sensor 351 is connected to the i-th second conductor line 312 (Xi), which are achieved by connecting the first terminal (321a) and second terminal (321b) of the i-th 1-to-2 switch 321 and by connecting the first terminal (331a) and third terminal (331c) of the i-th 2-to-1 switch 331.

Figure 7:
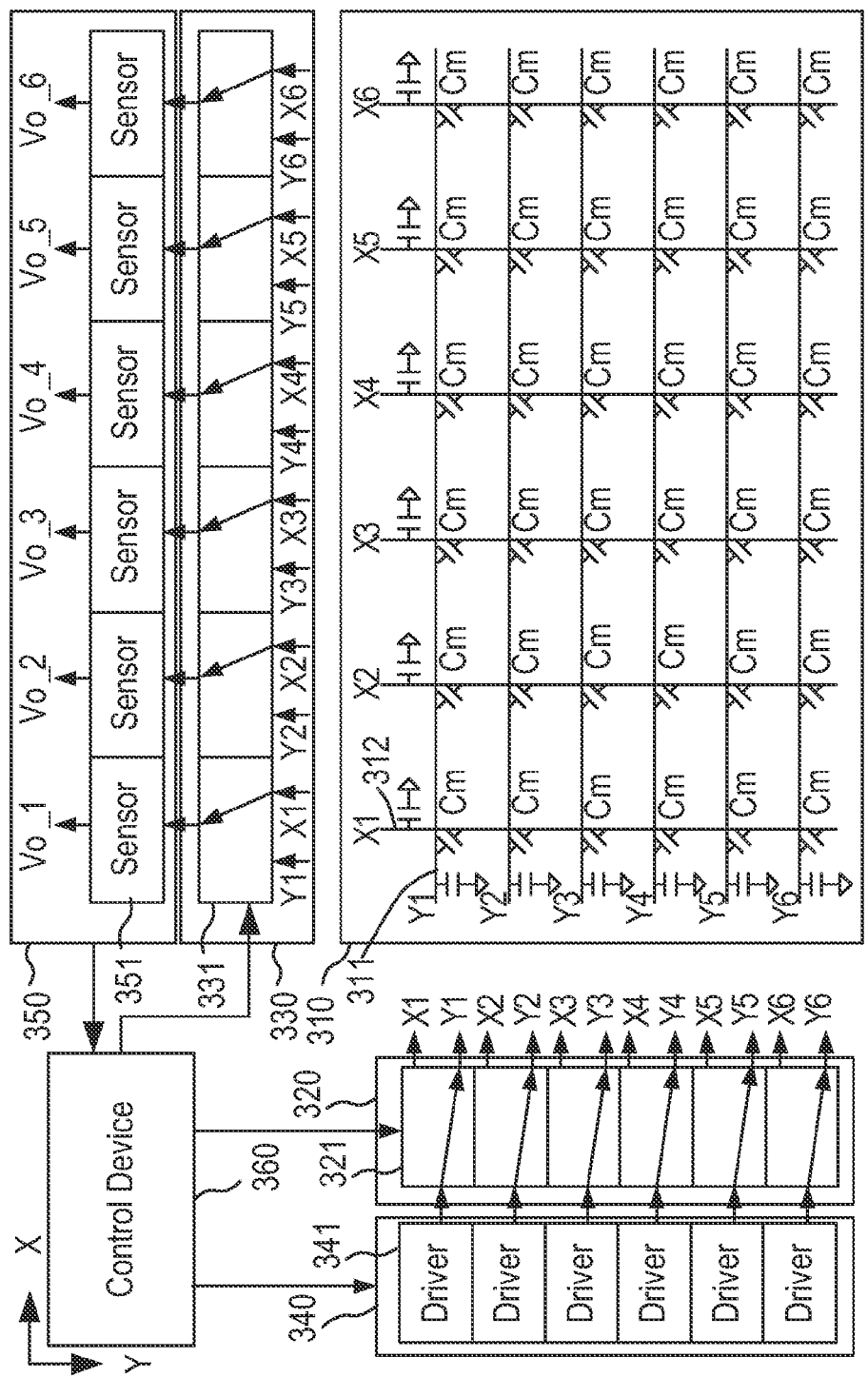
FIG. 7 is a schematic diagram of performing a mutual capacitance sensing according to an embodiment of the invention.

FIG. 7 is a schematic diagram of performing a mutual capacitance sensing according to an embodiment of the invention. As shown in FIG. 7, when the mutual capacitance sensing is performed, the control device 360 configures the i-th 1-to-2 switch 321 and the i-th 2-to-1 switch 331, such that the i-th driver 341 is connected to the i-th first conductor line 311 (Yi) and the i-th sensor 351 is connected to the i-th second conductor line 312 (Xi), which are achieved by connecting the first terminal (321a) and third terminal (321c) of the I-th 1-to-2 switch 321 and by connecting the first terminal (331a) and third terminal (331c) of the i-th 2-to-1 switch 331.

Figure 8:
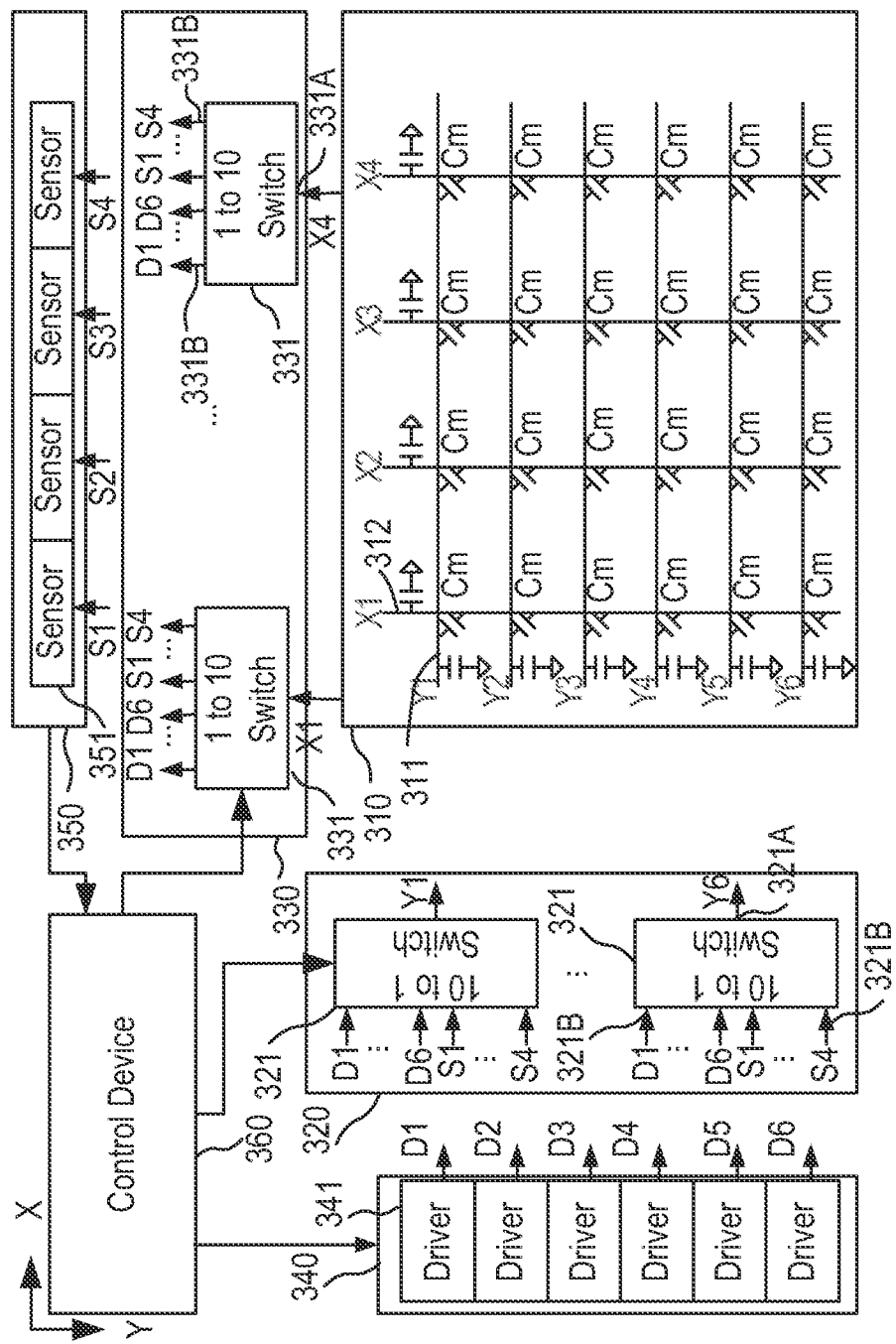
FIG. 8 is a circuit of a low power driving and sensing system for capacitive touch panels according to another embodiment of the invention.

FIG. 8 is a circuit of a low power driving and sensing system for capacitive touch panels according to another embodiment of the invention. The capacitive touch panel 310 has m first conductor lines 311 arranged in the first direction and n second conductor lines 312 arranged in the second direction, where m and n are each a positive integer, and m is not equal to n. The m first conductor lines 311 and the n second conductor lines 312 have parasitic and stray capacitance respectively, and the overlap of each first conductor line 311 and each second conductor line 312 forms the mutual capacitance Cm. For convenient description, m is 6 and n is 4 in this embodiment.

The first switch device 320 has m (m+n)-to-1 switches 321. The driving device 340 has m drivers 341. The sensing device 350 has n sensors 351. The j-th (m+n)-to-1 switch 321 has a first terminal (321A) connected to the j-th first conductor line 311 (Yj), and second to (m+n+1)-th terminals (321B) connected to the m drivers 341 and n sensors 351 respectively, where $1 \leq j \leq m$. As known by those skilled in the art, the (m+n)-to-1 switch 321 can be controlled to connect a selected one of the second to the (m+n+1)-th terminals (321B) to the first terminal (321A). The second switch device 330 has n 1-to-(m+n) switches 331. The g-th 1-to-(m+n) switch 331 has a first terminal (331A) connected to the g-th second conductor line 312 (Xg), and second to (m+n+1)-th terminals (331B) connected to the m drivers 341 and n sensors 351 respectively, where $1 \leq g \leq n$. As known by those skilled in the art, the 1-to-(m+n) switch 331 can be controlled to connect the first terminal (331A) to a selected one of the second to (m+n+1)-th terminals (331B).

As shown in FIG. 8, the driving device 340 has six drivers 341 (D1-D6). The sensing device 350 has four sensors 351 (S1-S4). The first switch device 320 has six 10-to-1 switches 321. The first 10-to-1 switch 321 has a first terminal (321A) connected to the first one of the first conductor line 311 (Y1), and second to eleventh terminals (321B) connected to the six drivers 341 and four sensors 351 respectively. The connections for the other 10-to-1 switches 321 are similar thereto and a detailed description is deemed unnecessary. The second switch device 330 has four 1-to-10 switches 331. The first 1-to-10 switch 331 has a first terminal (331A) connected to the first second conductor line 312 (X1), and second to eleventh terminals (331B) connected to the six drivers 341 and four sensors 351 respectively. The connections for the other 1-to-10 switches 331 are similar thereto and a detailed description is deemed unnecessary.

The self capacitance sensing can be divided into a first direction (Y) self capacitance sensing and a second direction (X) self capacitance sensing.

Figure 9:
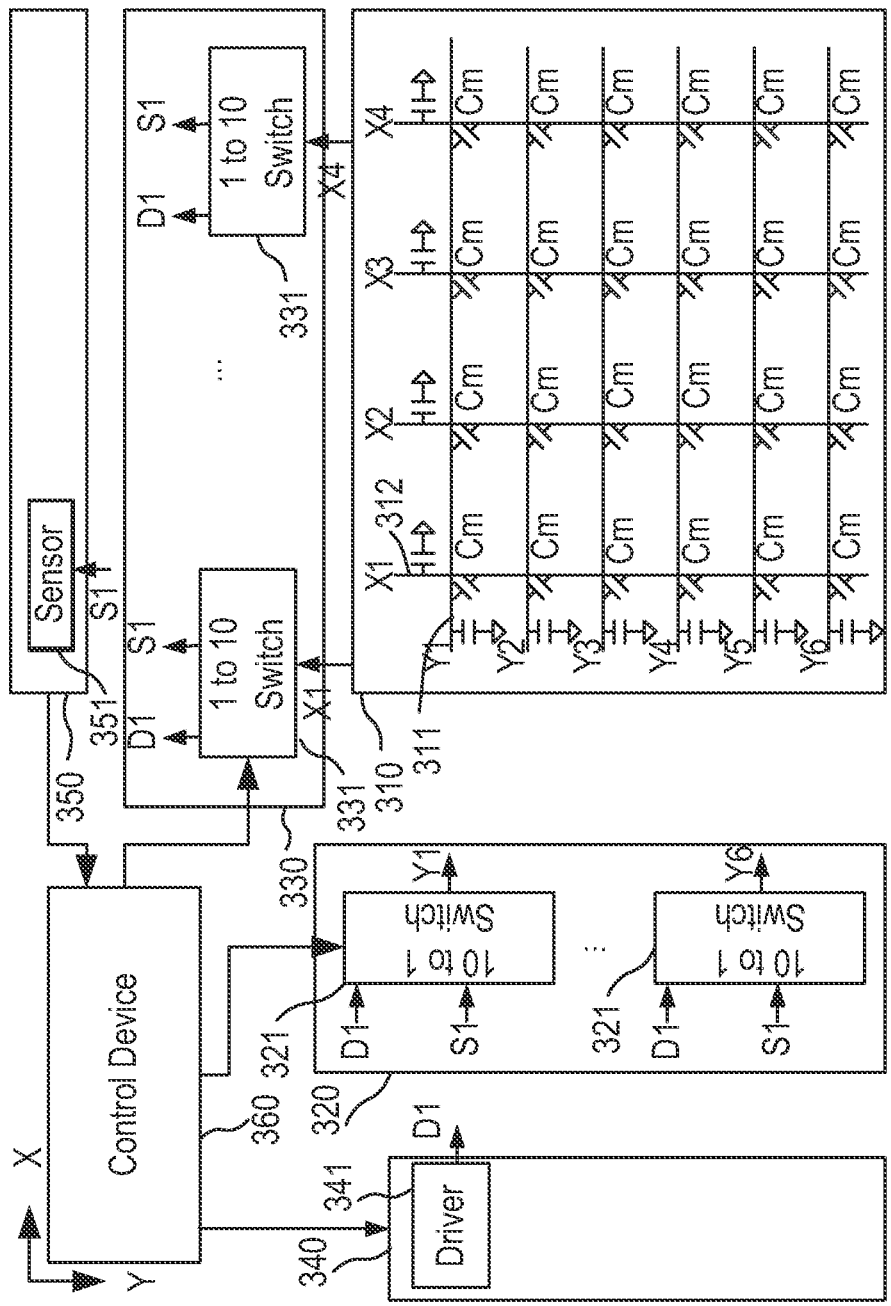
FIG. 9 is a schematic diagram of performing first and second direction self capacitance sensing according to another embodiment of the invention.

FIG. 9 is a schematic diagram of performing the first direction (Y) and second direction (X) self capacitance sensing according to another embodiment of the invention. As shown in FIG. 9, when the first direction (Y) self capacitance sensing is performed, the control device 360 configures the first 10-to-1 switch 321, such that the first driver 341 (D1) and the first sensor 351 (S1) are connected to the first first conductor line 311(Y1) to thereby sense a capacitance on the first first conductor line 311(Y1). Next, the first driver 341 (D1) and the first sensor 351 (S1) are connected to the second first conductor line 311(Y2) to thereby sense a capacitance on the second first conductor line 311(Y2). Next, the first driver 341 (D1) and the first sensor 351 (S1) are connected to the third first conductor line 311 (Y3) to thereby sense the third first conductor line 311 (Y3), and so on. The operation continues until a capacitance on the sixth first conductor line 311 (Y6) is sensed, and in this case, only the first driver 341 and the first sensor 351 are used.

When the second direction (X) self capacitance sensing is performed, the control device 360 configures the first 1-to-10 switch 331, such that the first driver 341 (D1) and the first sensor 351 (S1) are connected to the first second conductor line 312 (X1) to thereby sense a capacitance on the first second conductor line 312 (X1). Next, the first driver 341 (D1) and the first sensor 351 (S1) are connected to the second second conductor line 312 (X2) to thereby sense a capacitance on the second second conductor line 312 (X2). Next, the first driver 341 (D1) and the first sensor 351 (S1) are connected to the third second conductor line 312 (X3) to thereby sense a capacitance on the third second conductor line 312 (X3), and so on. The operation continues until a capacitance on the fourth second conductor line 311 (Y6) is sensed, and in this case, only the first driver 341 and the first sensor 351 are used.

In performing the first direction (Y) self capacitance sensing or the second direction (X) self capacitance sensing, only the first driver 341 and the first sensor 351 are used. Thus, the driving and sensing capabilities are the same every time, so as to avoid any possible error.

Figure 10:
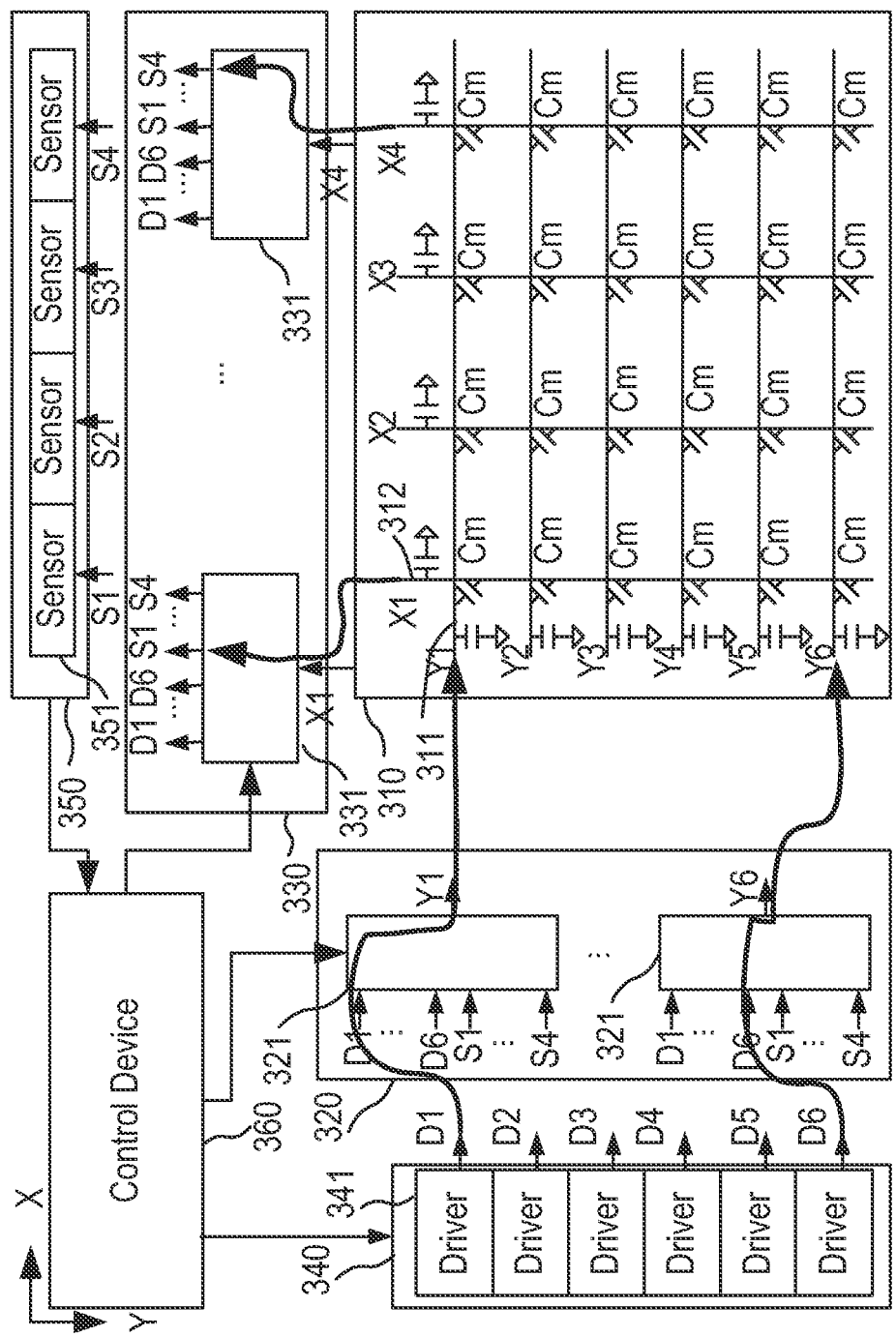
FIG. 10 is a schematic diagram of performing a mutual capacitance sensing according to another embodiment of the invention.

FIG. 10 is a schematic diagram of performing a mutual capacitance sensing according to an embodiment of the invention. As shown in FIG. 10, when the mutual capacitance sensing is performed, the control device 360 configures the j-th 10-to-1 switch 321 and the g-th 1-to-10 switch 331, such that the j-th driver 341 (Dj) is connected to the j-th first conductor line 311 (Yj), and the g-th sensor 351 (Sg) is connected to the g-th second conductor line 312 (Xg), where $1 \leq j \leq 6$, and $1 \leq g \leq 4$. More specifically, the first driver 341 (D1) is connected to the first first conductor line 311 (Y1), the second driver 341 (D2) is connected to the second first conductor line 311 (Y2), the third driver 341 (D3) is connected to the third first conductor line 311 (Y3), the fourth driver 341 (D4) is connected to the fourth first conductor line 311 (Y4), the fifth driver 341 (D5) is connected to the fifth first conductor line 311 (Y5), and the sixth driver 341 (D6) is connected to the sixth first conductor line 311 (Y6). Also, the first sensor 351 (S1) is connected to the first second conductor line 312 (X1), the second sensor 351 (S2) is connected to the second second conductor line 312 (X2), the third sensor 351 (S3) is connected to the third second conductor line 312 (X3), and the fourth sensor 351 (S4) is connected to the fourth second conductor line 312 (X4).

Figure 11:
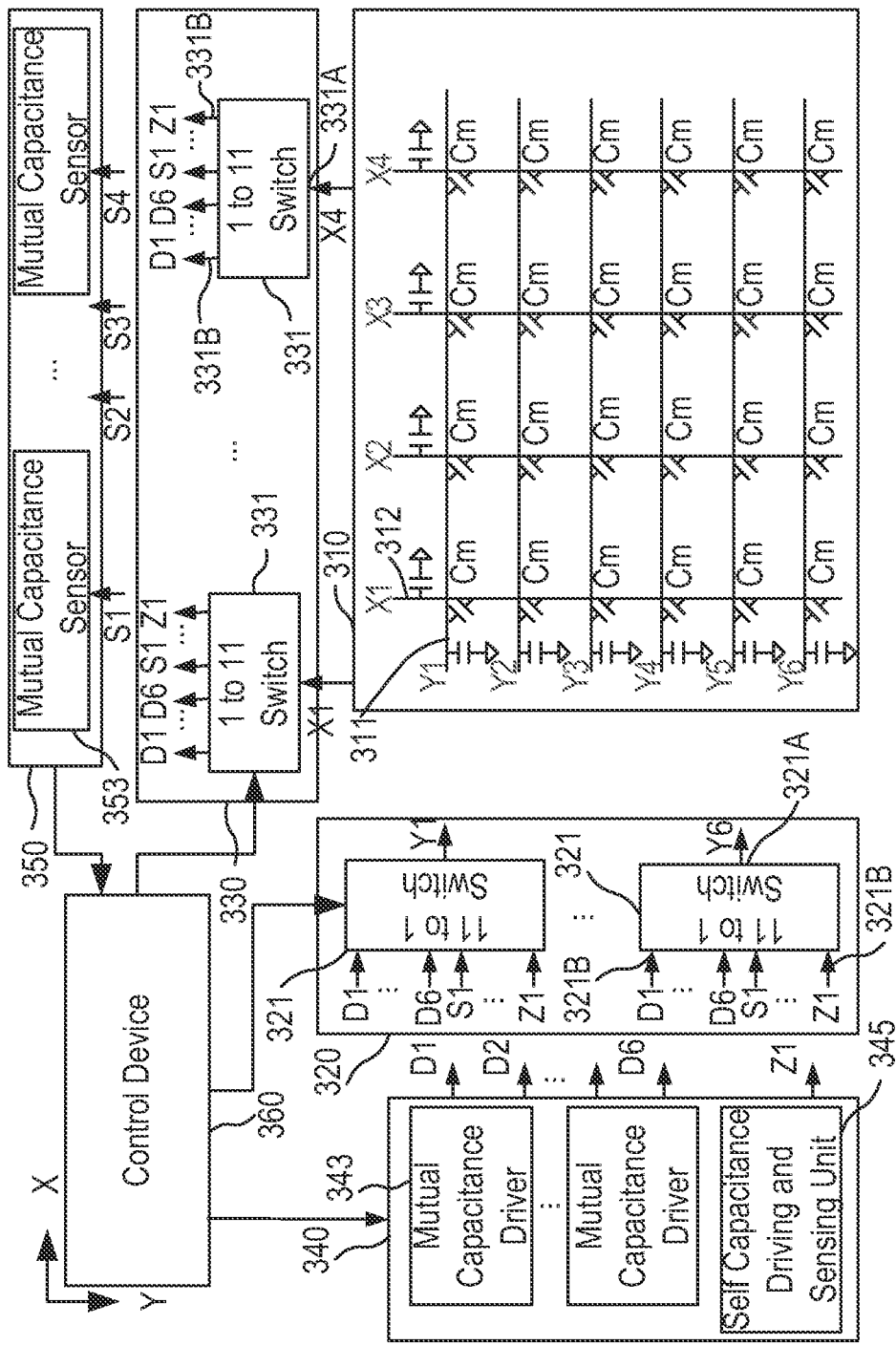
FIG. 11 is a circuit of a low power driving and sensing system for capacitive touch panels according to a further embodiment of the invention.

FIG. 11 is a circuit of a low power driving and sensing system for capacitive touch panels according to a further embodiment of the invention. In FIG. 11, the capacitive touch panel 310 has m first conductor lines 311 arranged in the first direction and n second conductor lines 312 arranged in the second direction, where m, n are each a positive integer, and m is not equal to n. The m first conductor lines 311 and the n second conductor lines 312 have parasitic and stray capacitance, respectively. The overlap of each first conductor line 311 and each second conductor line 312 forms the mutual capacitance Cm. For convenient description, m is 6, and n is 4 in this embodiment.

The first switch device 320 has m (m+n+z)-to-1 switches 321, the driving device 340 has m mutual capacitance drivers 343 and z self capacitance driving and sensing units 345, and the sensing device 350 has n mutual capacitance sensors 353, where m, n, z are each a positive integer.

The j-th (m+n+z)-to-1 switch 321 has a first terminal (321A) connected to the j-th first conductor line 311(Yj), and second to (m+n+z+1)-th terminals (321B) connected to the m mutual capacitance drivers 343, the z self capacitance driving and sensing units 345, and the n mutual capacitance sensors 353, respectively, where $1 \leq j \leq m$. As known by those skilled in the art, the (m+n+z)-to-1 switch 321 can be controlled to thereby connect a selected one of the second to (m+n+z+1)-th terminals (321B) to the first terminal (321A).

The second switch device 330 has n 1-to-(m+n+z) switches 331, the g-th 1-to-(m+n+z) switch 331 has a first terminal (331A) connected to the g-th second conductor line 312 (Xg), and second to (m+n+z+1)-th terminals (331B) connected to the m mutual capacitance drivers 343, the z self capacitance driving and sensing units 345, and the n mutual capacitance sensors 353, respectively, where $1 \leq g \leq n$. As known by those skilled in the art, the 1-to-(m+n+z) switch 331 can be controlled to thereby connect the first terminal (331A) to a selected one of the second to (m+n+z+1)-th terminals (331B).

As shown in FIG. 11, the driving device 340 has six mutual capacitance drivers 343 (D1-D6) and one self capacitance driving and sensing unit 345, the sensing device 350 has four mutual capacitance sensors 353, and the first switch device 320 has six 11-to-1 switches 321. The first 11-to-1 switch 321 has a first terminal (321A) connected to the first firstconductor line 311 (Y1), and second to twelfth terminals (321B) connected to the six mutual capacitance drivers 343, the self capacitance driving and sensing unit 345, and the four sensors 353, respectively. The connections for the other 11-to-1 switches 321 are similar and thus a detailed description is deemed unnecessary.

The second switch device 330 has four 1-to-11 switches 331. The first 1-to-11 switch 331 has a first terminal (331A) connected to the first second conductor line 312 (X1), and second to twelfth terminals (331B) connected to the six mutual capacitance drivers 343, the self capacitance driving and sensing unit 345, and the four sensors 353, respectively. The connections for other 1-to-11 switches 331 are similar and thus a detailed description is deemed unnecessary.

In the circuit of FIG. 11, when the self capacitance sensing is performed, it uses the self capacitance driving and sensing unit 345 to sequentially connect to the six first conductor lines 311 in the first direction and the four second conductor lines 312 in the second direction through the six 11-to-1 switches 321 and the four 1-to-11 switches 331, respectively, thereby performing the self capacitance sensing.

When the mutual capacitance sensing is performed, it uses the six mutual capacitance drivers 343 and four mutual capacitance sensors 353 to connect to the six first conductor lines 311 in the first direction and the four second conductor lines 312 in the second direction through the six 11-to-1 switches 321 and the four 1-to-11 switches 331, respectively, thereby performing the mutual capacitance sensing.

The detailed switch configuration is well known to those skilled in the art and can be easily implemented with reference to FIGS. 8-11, so a detailed description is deemed unnecessary.

In the circuit of FIG. 11, since the six mutual capacitance drivers 343 and the four mutual capacitance sensors 353 are only implemented in a mutual capacitance driving and a mutual capacitance sensing circuitry respectively, the occupied area is relatively reduced than that of the six drivers 341 and four sensors 351 of FIG. 8.

Figure 12:
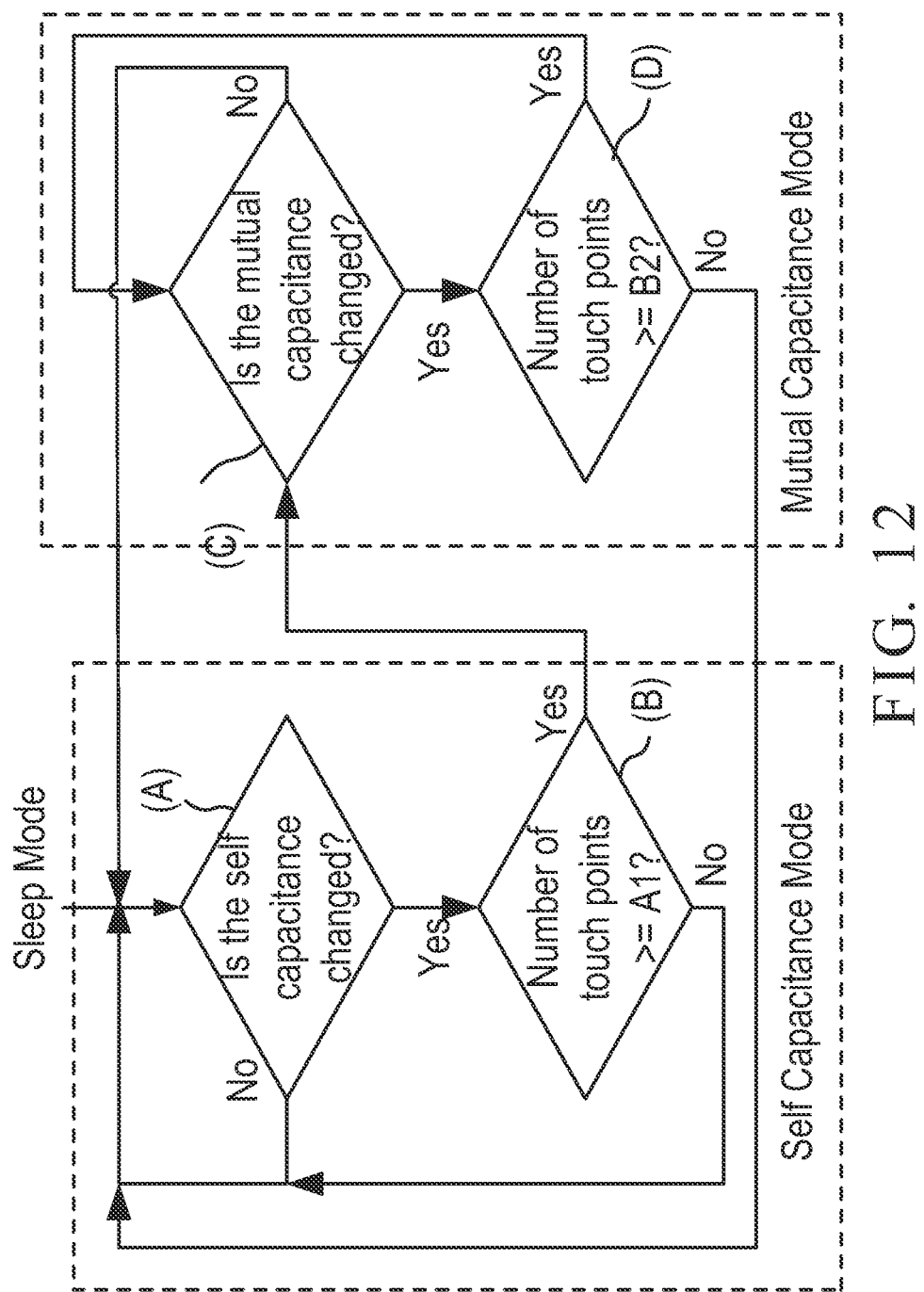
FIG. 12 is a flowchart of a low power driving and sensing method for capacitive touch panels according to an embodiment of the invention.

FIG. 12 is a flowchart of a low power driving and sensing method for capacitive touch panels according to an embodiment of the invention. The method is implemented in the low power driving and sensing system 330 as shown in FIG. 3. The system 300 includes a capacitive touch panel 310, a first switch device 320, a second switch device 330, a driving device 340, a sensing device 350, and a control device 360. The capacitive touch panel 310 has a sleep mode, a self capacitance mode, and a mutual capacitance mode.

As shown in FIG. 12, in step (A), when the capacitive touch panel 310 enters into the self capacitance mode from the sleep mode, the control device 360 determines whether a self capacitance of the capacitive touch panel 310 is changed. If yes, step (B) is executed, otherwise the procedure returns to step (A). Determination of whether a self capacitance of the capacitive touch panel 310 is changed by comparing a self capacitance data sensed by the sensing device 350 with a pre-stored self capacitance data for the capacitive touch panel 310.

In step (B), the control device 360 determines whether the number of touch points on the capacitive touch panel 310 is greater than or equal to a second predetermined number (A1). If yes, step (C) is executed, otherwise the procedure returns to step (A).

In step (C), the control device 360 configures the first switch device 320 and the second switch device 330 for entering the capacitive touch panel into the mutual capacitance mode, such that the sensing device can perform a mutual capacitance sensing. The control device 360 determines whether a mutual capacitance of the capacitive touch panel is changed. If yes, step (D) is executed, otherwise it indicates that the determination in step (B) is wrong and the procedure returns to step (A).

In step (C), the control device 360 compares a pre-stored mutual capacitance data for the capacitive touch panel 310 with a mutual capacitance data sensed by the sensing device 350 to thereby determine whether the mutual capacitance of the capacitive touch panel is changed.

In step (D), the control device 360 determines whether the number of touch points on the capacitive touch panel 310 is greater than or equal to a first predetermined number (B2). If yes, step (C) is executed, otherwise the procedure returns to step (A). The first predetermined number (B2) is preferred to be one.

In step (B), the control device 360 determines that the number of touch points on the capacitive touch panel 310 is not greater than or equal to the second predetermined number (A1), and step (A) is executed.

In other embodiments, when the number of determinations that the number of touch points on the capacitive touch panel 310 being not greater than or equal to the second predetermined number (A1) is over a predetermined value, it indicates that no user uses the capacitance touch panel, and the sleep mode is entered in order to save the power.

In step (D), the control device 360 determines that the number of touch points on the capacitive touch panel 310 is not greater than or equal to the first predetermined number B2), and step (A) is executed.

In view of the foregoing, it is known that the system 300 is initially in the self capacitance mode to sense a self capacitance. Then, based on the number of touch points sensed, the system 300 is maintained at the self capacitance mode when the total number of touch points is smaller than the second predetermined number (A1), otherwise enters in the mutual capacitance mode when the total number of touch points is greater than or equal to the second predetermined number (A1), thereby enhancing the multi-touch sensing performance.

After the mutual capacitance mode is entered, the sensing device 350 can sense a voltage signal corresponding to the mutual capacitance, and the control device 360 can filter the noises out of the voltage signal and determine the actual number of touch points. When the number of touch points is greater than or equal to the first predetermined number, the mutual capacitance mode is maintained. Conversely, when the number of touch points is smaller than the first predetermined number, the self capacitance mode is resumed to thereby save the power. Thus, the object of reducing the power consumption is achieved for prolonging the lifetime of the portable devices.

Although the present invention has been explained in relation to its preferred embodiment, it is to be understood that many other possible modifications and variations can be made without departing from the spirit and scope of the invention as hereinafter claimed.

What is claimed is:

1. A capacitive touch panel having mutual capacitance and self capacitance sensing modes, comprising:
   a capacitive touch panel, having a plurality of first conductor lines arranged in a first direction and a plurality of second conductor lines arranged in a second direction, wherein the first conductor lines and the second conductor lines include parasitic and stray capacitance respectively, and a mutual capacitance is formed at each overlap of the first and second conductor lines;

a first switch device, connected to the capacitive touch panel;

a second switch device, connected to the capacitive touch panel;

a driving device, connected to the first switch device, for driving the capacitive touch panel through the first switch device;

a sensing device, connected to the second switch device, for sensing a signal outputted by the capacitive touch panel through the second switch device; and a control device, connected to the first switch device, the second switch device, the driving device, and the sensing device, for configuring the first switch device and the second switch device to allow the capacitive touch panel to enter into a self capacitance mode, such that the driving device and the sensing device perform a self capacitance sensing, and to enter into a mutual capacitance mode, such that the driving device and the sensing device perform a mutual capacitance sensing;

wherein the capacitive touch panel includes the k first conductor lines arranged in the first direction and the k second conductor lines arranged in the second direction, the first switch device includes k 1-to-2 switches, the driving device includes k drivers, and an i-th 1-to-2 switch has a first terminal connected to an i-th driver, a second terminal connected to an i-th second conductor line, and a third terminal connected to an i-th first conductor line, where $1 \leq i \leq k$;

wherein when the sensing device performs the self capacitance sensing, the control device determines that a number of touch points on the capacitive touch panel is smaller than a second predetermined number and accordingly maintains configuration of the first switch device and second switch device, such that the sensing device performs the self capacitance sensing, and otherwise the control device configures the first switch device and the second switch device, such that the sensing device performs the mutual capacitance sensing.

2. The capacitive touch panel as claimed in claim 1, wherein, when the sensing device performs the mutual capacitance sensing, the control device determines that the number of touch points on the capacitive touch panel is smaller than a first predetermined number and accordingly configures the first switch device and the second switch device, such that the sensing device performs the self capacitance sensing.

3. The capacitive touch panel as claimed in claim 2, wherein, when the sensing device performs the mutual capacitance sensing, the control device determines that the number of touch points on the capacitive touch panel is greater than or equal to the first predetermined number and accordingly maintains configuration of the first switch device and the second switch device, such that the sensing device performs the mutual capacitance sensing.

4. The capacitive touch panel as claimed in claim 1, wherein the second switch device includes k 2-to-1 switches; the sensing device includes k sensors, and an i-th 2-to-1 switch has a first terminal connected to an i-th sensor, a second terminal connected to the i-th first conductor line, and a third terminal connected to the i-th second conductor line.

5. The capacitive touch panel as claimed in claim 4, wherein the self capacitance sensing includes a first direction self capacitance sensing and a second direction self capacitance sensing.

6. The capacitive touch panel as claimed in claim 4, wherein when the first direction self capacitance sensing is performed, the control device configures the i-th 1-to-2 switch and the i-th 2-to-1 switch, such that the i-th driver and the i-th sensor are connected to the i-th first conductor line, and when the second direction self capacitance sensing is performed, the control device configures the i-th 1-to-2 switch and the i-th 2-to-1 switch, such that the i-th driver and the i-th sensor are connected to the i-th second conductor line.

7. The capacitive touch panel as claimed in claim 6, wherein when the first direction mutual capacitance sensing is performed, the control device configures the i-th 1-to-2 switch and the i-th 2-to-1 switch, such that the i-th driver is connected to the i-th first conductor line, and the i-th sensor is connected to the i-th second conductor line.

8. A low power driving and sensing method for a capacitive touch system including a capacitive touch panel, a first switch device, a second switch device, a driving device, a sensing device, and a control device, wherein the capacitive touch panel having a sleep mode, a self capacitance mode, and a mutual capacitance mode, the low power driving and sensing method comprising the steps of:

(A) using the control device to determine whether a self capacitance of the capacitive touch panel is changed when the capacitive touch panel enters into the self capacitance mode from the sleep mode, and executing step (B) when the self capacitance of the capacitive touch panel is changed, otherwise returning to step (A);

(B) using the control device to determine whether a number of touch points on the capacitive touch panel is greater than or equal to a second predetermined number, and executing step (C) when the number of touch points on the capacitive touch panel is greater than or equal to the second predetermined number;

(C) using the control device to configure the first switch device and the second switch device for allowing the capacitive touch panel to enter into the mutual capacitance mode such that the sensing device performs a mutual capacitance sensing, using the control device to determine whether a mutual capacitance of the capacitive touch panel is changed, and executing step (D) when the mutual capacitance of the capacitive touch panel is changed, otherwise returning to step (A); and (D) using the control device to determine whether the number of touch points on the capacitive touch panel is greater than or equal to a first predetermined number, and executing step (C) when the number of touch points on the capacitive touch panel is greater than or equal to the first predetermined number, otherwise returning to step (A).

9. The method as claimed in claim 8, wherein step (A) is executed when the control device in step (B) determines that the number of touch points on
the capacitive touch panel is not greater than or equal to the second predetermined number.

10. The method as claimed in claim 9, wherein step (A) is executed when the control device in step (D) determines that the number of touch points on the capacitive touch panel is not greater than or equal to the first predetermined number.

11. The method as claimed in claim 8, wherein the control device in step (A) compares a pre-stored self capacitance data for the capacitive touch panel with a self capacitance data sensed by the sensing device so as to determine whether the self capacitance of the capacitive touch panel is changed.

12. The method as claimed in claim 11, wherein the control device in step (C) compares a pre-stored mutual capacitance data for the capacitive touch panel with a mutual capacitance data sensed by the sensing device so as to determine whether the mutual capacitance of the capacitive touch panel is changed.

\* \* \* \* \*